United States Patent [19]

Hallman

[11] 3,873,440
[45] Mar. 25, 1975

[54] STARTUP METHOD FOR EXOTHERMIC CATALYTIC REACTION ZONES

[75] Inventor: Newt M. Hallman, Mount Prospect, Ill.

[73] Assignee: Universal Oil Products Company, Des Plaines, Ill.

[22] Filed: Nov. 14, 1973

[21] Appl. No.: 418,525

[52] U.S. Cl.................. 208/108, 208/165, 208/264
[51] Int. Cl............................................. C10g 13/16
[58] Field of Search .......... 208/107, 108, 143, 365, 208/264, 165

[56] References Cited
UNITED STATES PATENTS

| | | | |
|---|---|---|---|
| 2,989,461 | 6/1961 | Eastman et al. ..................... | 208/107 |
| 3,215,618 | 11/1965 | Watkins ............................. | 208/143 |
| 3,451,922 | 6/1969 | Parker ............................... | 208/143 |
| 3,564,067 | 2/1971 | Brenner et al. ..................... | 208/143 |

*Primary Examiner*—Herbert Levine
*Attorney, Agent, or Firm*—James R. Hoatson, Jr.; Robert W. Erickson; William H. Page, II

[57] ABSTRACT

Direct fired charge heaters are deleted from the equipment needed to start an exothermic catalytic hydrocarbon conversion process by changing the flow through the high pressure heat exchangers normally used to recover heat from the reactor effluent. Instead, heat produced in a product fractionation heater is added to a reactor effluent recirculation loop containing the reactor by the use of these heat exchangers. The heat exchanged reactor effluent is returned to the reactor with a recycle pump until the temperature of this charge stream is sufficient to initiate the exothermic reaction and thereby produce a hot effluent stream which is used to heat fresh charge material.

6 Claims, 1 Drawing Figure

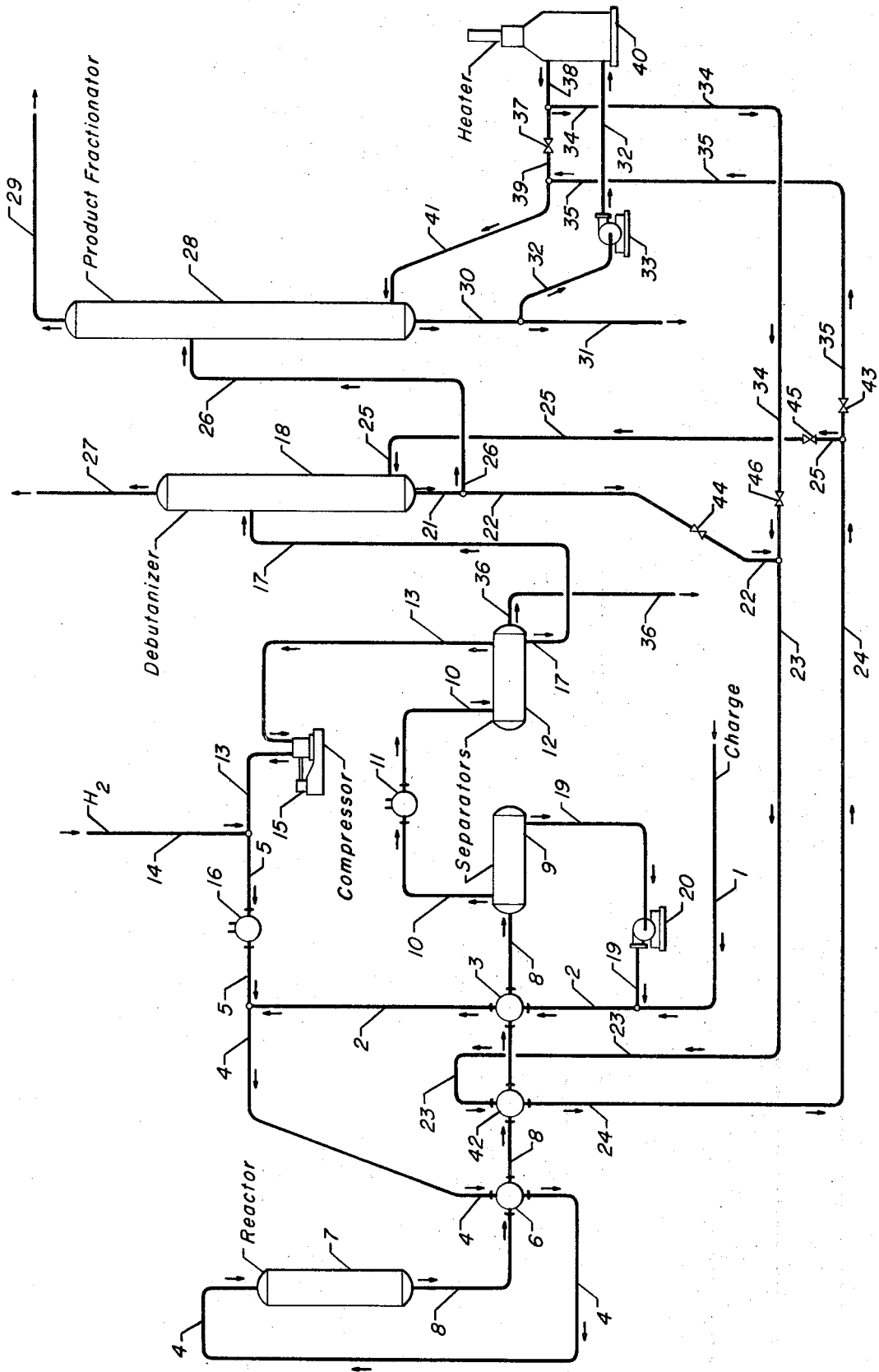

STARTUP METHOD FOR EXOTHERMIC CATALYTIC REACTION ZONES

BACKGROUND OF THE INVENTION

1. Field of the Invention

My invention relates to startup procedures for exothermic hydrocarbon conversion processes such as hydrotreating and hydrocracking. More specifically it relates to a method of heat exchanging to supply heat to the charge stream of such a process in order to raise the reactor temperature and make the reaction self sustaining.

2. Description of the Prior Art

It is a common practice to heat exchange the effluent of a reaction zone with the charge stream to the reaction zone or some other stream such as the feed to a fractionator. This procedure recovers heat from the effluent and lowers its temperature to allow a reduction in cooler duties and more facile separation of light and heavy fractions of the effluent in subsequent vapor-liquid separators. A charge heater is still normally required on a hydrotreating process to raise the feedstock's temperature after this heat exchange with the effluent because the temperature rise through the reaction zone is normally maintained at some relatively low preset value to maximize catalyst life. This reduces the temperature differential available between the charge stream and effluent in the effluent heat exchanger and the temperature to which it is possible to raise the charge stream by heat exchange. A charge heater is also considered a necessity to create an initial hot charge stream as the precursor of any hot effluent.

Heat recovery from a reactor effluent is demonstrated in such references as U.S. Pat. No. 3,429,803. A method of starting up a hydrocarbon treating process concerned with minimizing plant upsets due to flow and temperature changes is presented in U.S. Pat. No. 3,053,758.

BRIEF SUMMARY OF THE INVENTION

The invention is the elimination of the need for a charge stream heater on the exothermic reaction zone of a hydrocarbon conversion process by utilizing a heater which is required in some other segment of a process as an alternate heat source and injecting this heat into a recirculated reaction zone charge stream through the heat exchangers normally used to recover heat from the reaction zone effluent.

DESCRIPTION OF THE DRAWING

The attached drawing illustrates a preferred embodiment of my invention used in conjunction with a hydrotreating process. A portion of charge stock, such as a heavy cycle oil, enters through line 1 and is mixed with recycled liquid material from line 19. Initially, the flow of fresh charge material will be very small and possibly may not be started until the process has begun to convert some of the material circulating through it. This charge material will pass through reaction zone effluent heat exchanger 3 in line 2 and then join with recycled vapor material carried by line 5 to form a reaction zone charge stream. This charge stream enters line 4 which carries it through heat exchanger 6 wherein it is again heat exchanged with the reactor effluent. The charge stream then continues through line 4 into as yet unoperating reaction zone 7. Line 8 then carries the resulting stream of reaction zone effluent through heat exchangers 6, 42 and 3 and finally into a hot separator 9. The heavier components of the effluent are removed as a liquid stream through line 19 and passed into recycle pump 20 which causes the recirculation of the liquid reaction zone effluent back into line 2.

The lighter components of the reaction zone effluent stream leave separator 9 through line 10 and pass through cooler 11. This cooler would preferably not remove any heat from the system until the reaction zone has "kicked off" and is liberating sufficient heat to bring itself up to operating temperatures. The great majority of the light effluent components will therefore enter cold separator 12 as a vapor stream which is removed by line 13 and repressurized in recycle compressor 15. Any required makeup hydrogen is supplied by line 14 and the recycle vapor stream then passes through a heat exchanger 16 in line 5 before joining the recycled liquid in line 2. Liquid material collected in separator 12 may be passed by line 17 into a product stream stripper column 18 or may alternatively be sent to storage via line 36 until the reactor is on-stream.

When the reaction zone is on-stream, debutanizer 18 will strip light ends from the product stream and pass them overhead through line 27. A stream removed through line 21 will be split into a first part fed to product fractionator 28 through line 26 and a second part passed through heat exchanger 42 via lines 22, 23, 24 and 25. Valves 46 and 43 are closed during this on-stream operation and valves 44 and 45 are open. This second part is raised in temperature or vaporized with heat gained from the reactor effluent passing through line 8 and returned to the debutanizer 18. Fractionator 28 splits the first part into a light portion withdrawn in line 29 and a heavy portion withdrawn in line 30. For simplicity, no reflux systems are shown. The portion withdrawn from the bottom of the fractionator 28 is split into a first part removed as a product stream in line 31 and a second part which enters line 32 and is pressurized in pump 33. This material then enters a direct fired heater means 40 where it is vaporized before being passed back to a lower portion of fractionator 28 to supply the heat needed for distillation of the product stream. The vaporized material is passed to the fractionator through lines 38, 39 and 41. In this illustration, the product fractionation zone is contiguous to the reaction zone and consists of a stripper column and a product splitter. The heat of reaction normally recovered in separator 42 may however be used in other fractionators which are detached from this process unit.

While the reaction zone 7 is still being brought on-stream, there will be no product material produced which would require fractionating and therefore operation of the heater means 40 would not be required. But by the process of this invention, a quantity of a liquid hydrocarbon material will be charged into the fractionating column 28, withdrawn through lines 30 and 32 and pressured into heater 40 by pump 33. This hydrocarbon material will be either heated or vaporized in direct fired heater means 40 and passed into line 34 via line 38, control valve 37 being closed during this startup procedure. Line 34 carries the heated hydrocarbon stream to line 23 which is now isolated from line 22 by a valve 44. Valve 45 is also closed but valves 46 and 43 are now open. The heated hydrocarbon stream therefore passes through indirect heat exchange means 42 and loses heat to the relatively cold charge stream being recirculated through the reaction zone 7 via lines 4 and 8. The heated hydrocarbon stream material which has passed through the heat exchanger is then returned to fractionating column 28 through lines 24, 35 and 41. The need for a direct fired charge heater on the lines carrying the charge stream to the reaction zone is therefore eliminated by this alternate use of heat exchanger 42 normally used to recover heat from the reaction zone effluent for use in a fractionation zone.

DETAILED DESCRIPTION

A charge heater is commonly shown on solid bed hydrocarbon conversion processes requiring a hot feed stream to the reaction zone and often accounts for about 10 to 15 percent of the cost of the basic process equipment for that particular process. It is known in the art to exchange a hot effluent with the charge stream to recover heat, but this method is not usable in a startup procedure since there is no hot effluent. Secondly, the trend has been toward the operation of exothermic reactions such as hydrocracking with a minimal temperature profile to maximize catalyst life. This is often accomplished by the injection of a quench stream into a midpoint of the reaction zone. Because of this, the effluent from the reaction zone is often only about 50°F. warmer than the charge stream, and the temperature to which the charge stream can be raised solely by heat exchange with the effluent is below that needed for maintenance of the reaction.

Nevertheless in situations where higher temperature profiles on the order of 100°F. and greater are acceptable, heating the feed stream solely by indirect heat exchange becomes increasingly more attractive as the allowable temperature rise through the reaction zone increases. With a moving-bed reactor, the problem of catalyst deactivation falls out of the picture and reactor temperature profiles are constrained only be relative product yields. Therefore, although not a necessity, the use of this startup procedure in conjunction with moving-bed reactor is preferred. The term "reaction zone" is therefore intended to mean any single or multiple grouping of vessels containing a solid catalyst which promotes an exothermic reaction and may comprise a fixed-bed, moving-bed or radial flow reactor or a group of reactors.

There still remain several other practical considerations which may limit the usage of my invention. First, there must be an indirect heat exchange means which can be used to supply the heat to startup the unit. Since it is an objective of my invention to reduce the capital costs of erecting a hydrocarbon conversion process, it is not compatible with this objective to require additional high pressure heat exchangers. This limitation is more important in high pressure units since the heat exchanger must be capable of withstanding the large pressure difference between the reactor charge stream and the heated hydrocarbon which will be at the lower normal operating pressure of the fractionating column. Fortunately, many units today are already being designed with a heat exchanger capable of withstanding such a pressure differential to effect recovery of heat from the reaction zone effluent for use in a product fractionator in a manner similar to that illustrated by indirect heat exchange means 42.

A second practical consideration revolves around the availability of a pump which will handle hot recycle material. Since these pumps are more expensive than pumps for cold material, it is common practice to first pressurize the charge stream and then heat it. However, with hydrocracking units treating heavier charge stocks and with a great many petrochemical units, there is often a sizable liquid recycle stream. A recycle pump capable of handling these hot materials is therefore already in the design and does not add to the cost of implementing this startup procedure on these units. The additional costs of utilizing this procedure are therefore only those incurred in providing transfer lines and valving for the heated hydrocarbon stream produced in direct fired heater 40. These lines are illustrated as lines 34 and 35, which interconnect with lines 23 and 24 normally used to pass debutanizer bottoms to indirect heat exchange means 42.

To clarify the terminology used in the appended claims, a direct fired heater is meant to be a heater, such as a furnace or reboiler, wherein a hydrocarbon stream is passed through conduits exposed directly to a flame. By the phrase "indirect heat exchange means" it is intended to denote an apparatus wherein heat is transferred from one fluid stream to another through a physical barrier such as a conduit which prevents direct contact of the fluid streams.

The composition of the heated hydrocarbon is not a controlling consideration and may vary from a portion of a clean, previously produced fractionator bottoms to a commercially available heat transfer fluid or even a vapor. This heated hydrocarbon stream need not be produced in a product fractionator located downstream of the reaction zone being put on-stream. If it is possible to recover sufficient heat from the reactor effluent, to fractionate the product, the subject unit may not contain a direct fired heater. If that is the case, then the heater on a fractionator on another unit or the charge heater to another unit may be utilized. Likewise, the equivalent to heat exchanger 42 may be an indirect heat exchange means normally used to recover heat from the process for use in any fractionator or for heating any charge streams and the like even if the heat recovered is not used directly in the further processing of the reaction zone effluent. The phrase "normally used to recover heat from the process" is therefore intended to refer to any heat exchange means used to recover or remove heat from the reaction zone effluent or a stream derived from it while the unit is operating at its normal on-stream conditions.

Using this phraseology, the invention may be defined as a startup procedure for the reaction zone of a hydrocarbon conversion process, in which reacton zone an exothermic reaction is performed, and which comprises the steps of: (a) heating a hydrocarbon stream by the use of a direct fired heater to form a heated hydrocarbon stream; (b) passing said heated hydrocarbon stream through an indirect heat exchange means which is normally used to recover heat from said process when the process is on-stream; (c) passing a relatively cold, as compared to on-stream operating conditions, charge stream of said process into said reaction zone which is being placed on-stream; (d) passing at least a portion of an effluent stream of said reaction zone through said indirect heat exchange means to form a relatively warm stream of reaction zone effluent, as compared to the reaction zone effluent then leaving said reaction zone; (e) recycling at least a portion of said relatively warm reaction zone effluent to said reaction zone as at least a portion of said relatively cold charge stream passed into the reaction zone to effect the raising in temperature of said reaction zone; and, (f) stopping the passage of said heated hydrocarbon stream through said indirect heat exchange means when the charge stream entering said reaction zone reaches a temperature capable of propagating said exothermic reaction at a rate sufficient to produce a predetermined temperature rise through said reaction zone.

The phrase "relatively cold" is used in reference to the temperature of the charge stream to the reaction zone when it is at any temperature less than that necessary for successful propagation of the desired reaction. Therefore, a charge stream having a temperature of 400°F. may, by this definition, be "relatively cold." However, the phrase "relatively warm" when used in reference to the temperature of a portion of the reaction zone effluent is meant to indicate a comparison with the temperature of the reaction zone effluent issuing from the reaction zone at the moment the comparison is being made. That is to say, a "relatively warm" portion of reaction zone effluent produced by heat exchange with the heated hydrocarbon stream could be at a temperature of 80°F., for example, when the reaction zone effluent is 70°F.

In the preferred embodiment illustrated in the drawing, the reaction zone effluent is first passed through the several heat exchangers and then into product separator 9. This separator is normally operated at substantially the same pressure as the reaction zone with only a slight reduction being caused by the normal pressure drop through the separators. In many petrochemical processes, the operating pressure of the process may be rather low and range from 50 to 100 psig. Hydrorefining operations such as hydrotreating and hydrocracking are typically carried out at higher pressures of from about 100 to about 3000 psig. to improve yields or catalyst life. With a moving-bed reaction zone, the need for such high pressures is reduced and it is not likely a moving-bed hydrorefining unit would operate in excess of 1000 psig. This is especially true when the difficulties of high pressure catalyst transfer is taken into consideration. A preferred operating pressure range when a moving-bed reaction zone is used is therefore from 100–1,000 psig.

A second or cold separator 12 is shown receiving a mixed-phase stream formed by the further cooling of the vaporous effluent of the hot separator 9 by indirect heat exchange means 11. If a stripped hydrocarbon stream is used as the charge material, relatively little material other than hydrogen will flow through line 10 and need pass through compressor 15. This reduces the need to cool this material to protect the compressor from liquid carry-over and hence does not fight the warming of the recycle streams. This is especially true if separator 12 is designed to run cold as compared to reaction zone effluent. Until the unit approaches a state of being on-stream, it is likely that any product will be produced. In the preferred embodiment illustrated, the small amount of intermediate material accumulated in separator 12 would be withdrawn through line 36.

When the reaction zone reaches a temperature capable of propagating the exothermic reaction at a rate sufficient to produce a predetermined temperature rise through the reactor, the heat input via heat exchange means 42 may be terminated. Liquid product material will then be allowed to pass through line 17 to begin lining out debutanizer 18. The phrase "a temperature capable of propagating said exothermic reaction at a rate sufficient to produce a predetermined temperature rise through said reaction zone" is intended to mean that temperature at which the desired reaction will occur, when the charge stream is in contact with the catalyst bed, at a rate sufficient to release heat and increase the rate of subsequent reaction in downstream portions of the reaction zone and to thereby produce a substantial temperature increase in the reaction zone effluent. The predetermined temperature rise is that necessary to allow sufficient heating of the process charge stream by indirect heat exchange with the reaction zone effluent to eliminate the need for a charge stream heater. This may be in the order of 50°F., but as already discussed, for more efficient heat exchange, it is preferred that the temperature rise be above 100°F. and more preferably 200°F. or more. The temperature rise required in each case will depend on many variables such as reactant composition and catalyst activity.

The subject startup procedure may be applied to a process such as that shown in U.S. Pat. No. 3,203,889. This example of the prior art provides separate hydrorefining and hydrocracking reaction zones and demonstrates the recycling of reactor effluent liquid streams to either of them. As used in this specification and the appended claims, hydrorefining is intended to cover both the processes of hydrotreating, or impurity removal, and hydrocracking. In general, both of these processes are hydrogen consuming, exothermic processes carried out in the presence of hydrogen and promoted by a solid, non-fluidized catalyst. In this regard, hydrorefining conditions will include a pressure in the range specified above and a temperature as required for propagating the desired reaction. Hydrotreating will generally be carried out over a lower temperature range of from 400°F. to 750°F. while hydrocracking will often require a higher temperature of up to 900°F., especially in a moving-bed reaction zone.

A further description of suitable hydrorefining processing conditions and catalysts may be obtained by referring to U.S. Pat. No. 3,254,018. Inherent in the practice of this reference are the use of separate liquid recycle streams through each of the two reaction zones. As the above references indicate, the liquid phase material separated from the reactor effluent and eventually recycled to the reaction zone may pass through a product stream fractionation zone such as a stripper column. Therefore, in hydrorefining processes, the recycle loop required for the performance of the subject startup method may exist for the purpose of returning unconverted materials to the reaction zone. In petrochemical processes, a large stream of a single reactant, such as benzene, is often recycled because it is maintained in a higher than stoichiometric ratio to optimize conversion or selectivity. The preferred embodiment of my invention does not include passage through a fractionating column of the reaction zone effluent material which is to be heated and recycled because the great majority of fractionating columns are built for operation at a lower pressure than the reaction zone. If a recycle pump of sufficient capacity to repressurize the fractionator effluent is available, this mode of operation may be feasible, but it is still more expensive in terms of utility cost. Also, by the preferred method of my invention, the only change in the flow of the reactant stream as the process comes on-stream is the normal decrease in the percentage of recycle material passed to the reactor and increase in the amount of product separated for fractionation.

A more detailed description of one mode of the subject startup method is a startup procedure for a reaction zone of a catalytic hydrocarbon conversion process in which an exothermic reaction is conducted, which process comprises the steps of: (a) passing a charge stream of the process through a first indirect heat exchange means normally used to heat said charge stream by indirect heat exchange with an effluent stream of said reaction zone; (b) passing said charge stream into said reaction zone and through a bed of solid catalyst which promotes a desired exothermic reaction, and forming a reaction zone effluent; (c) passing a stream of the reaction zone effluent through said first indirect heat exchange means; (d) passing at least a portion of said stream of reaction zone effluent through a second indirect heat exchange means normally used to recover heat from this same portion of the stream of reaction zone effluent; (e) passing a hydrocarbon stream which has been heated by means of a direct fired heater through said second indirect heat exchange means to effect the heating of the portion of said stream of reaction zone effluent passed through the second heat exchange means; and, (f) recycling the portion of said stream of reaction zone effluent which has been heated in said second indirect heat exchange means as at least a portion of said charge stream of the process to effect a raising in temperature of said reaction zone.

The phrase "startup procedure" is intended to mean those steps taken to raise the temperature of a reaction zone to its normal on-stream range after the initial construction of the unit or its shut down for maintenance or regeneration of the catalyst. Often in hydrorefining there are other steps and procedures which must be performed before beginning operation of the unit. One specific example of a method of reducing and sulfiding a commercial black oil desulfurization catalyst used in a fixed bed operation is set out in U.S. Pat. No. 3,642,613. It is significant to note the several temperature ranges specified, which indicate that the gradual heating produced by the indirect heat input of this procedure will not be a detriment to the successful commercial application of this procedure. That is to say, the increased time required to raise the temperature of the reaction zone by indirect heat exchange rather than by a direct fired heater will not of itself make it less advantageous to utilize this procedure since the full heating potential of a charge heater is not required until the final stages of placing the reaction zone on-stream. One advantage to the use of a moving-bed reactor is the elimination of the requirement to shut down the process to regenerate the catalyst. The longer run times which result reduce the number of startups required, and this further reduces the disadvantages associated with any reduced rate of heating by this process as compared to a direct fired charge heater.

I claim as my invention:

1. A startup procedure for a reaction zone of a hydrocarbon conversion process, in which reaction zone an exothermic reaction is performed at a temperature in the range of from about 400°F. to about 900°F., which comprises the steps of:
   a. heating a hydrocarbon stream in a direct fired heater to form a heated hydrocarbon stream;
   b. passing said heated hydrocarbon stream through an indirect heat exchange means which is normally used to recover heat from the effluent of said reaction zone when the process is on-stream with the reaction zone being operated at a temperature within said range;
   c. passing through said reaction zone a charge stream for the hydrocarbon conversion process at a temperature substantially below said temperature in the 400° – 900°F. range while the reaction zone is at a temperature below the last-named temperature;
   d. passing an effluent stream from said reaction zone through said indirect heat exchange means to form a relatively warm stream of reaction zone effluent as compared to the reaction zone effluent then leaving said reaction zone;
   e. recycling at least a portion of said relatively warm reaction zone effluent to said reaction zone as at least a portion of said charge stream passed into said reaction zone and continuing such recycling until the temperature of said reaction zone is raised to said temperature in the 400° – 900°F. range; and,
   f. then discontinuing the passage of said heated hydrocarbon stream through said indirect heat exchange means when the charge stream entering said reaction zone has reached a temperature capable of propagating said exothermic reaction at a rate sufficient to produce a predetermined temperature rise through said reaction zone.

2. The process of claim 1 wherein said predetermined temperature rise through the reaction zone is at least 100°F.

3. The process of claim 2 wherein said direct fired heater is used to supply heat to a fractionation zone.

4. The process of claim 3 wherein the heat normally recovered through said indirect heat exchange means is used in a product fractionation zone.

5. The process of claim 4 wherein said process comprises the hydrocracking of said charge stream.

6. The process of claim 2 wherein said reaction zone comprises a moving-bed catalytic reactor operated at a pressure of less than 1000 psig.

* * * * *